United States Patent
Shah et al.

(10) Patent No.: US 7,108,730 B2
(45) Date of Patent: Sep. 19, 2006

(54) METHOD FOR PROVIDING CONTROLLED HEAT TO A PROCESS

(75) Inventors: Rashmi K Shah, Houston, TX (US); Thomas Mikus, Houston, TX (US); Pettai Krishna Shankar, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/404,845

(22) Filed: Apr. 1, 2003

(65) Prior Publication Data
US 2003/0182858 A1    Oct. 2, 2003

Related U.S. Application Data

(62) Division of application No. 09/168,770, filed on Oct. 8, 1998.

(60) Provisional application No. 60/062,439, filed on Oct. 8, 1997.

(51) Int. Cl.
*C10J 3/00* (2006.01)

(52) U.S. Cl. ............... 48/203; 48/198.1; 48/127.9; 422/173; 422/198; 422/197; 422/200; 422/201; 431/162; 431/165; 431/174; 431/178; 431/182

(58) Field of Classification Search ............ 48/127.9, 48/198.1, 203; 422/173, 198, 197, 200, 201; 431/162, 165, 174, 178, 182
See application file for complete search history.

(56) References Cited

U.S. PATENT DOCUMENTS

| | | | |
|---|---|---|---|
| RE26,990 E | * 11/1970 | Bongiomo | 48/198.8 |
| 4,029,146 A | 6/1977 | Hart et al. | 165/166 |
| 4,104,018 A | 8/1978 | McKay | 432/29 |
| 4,692,306 A | * 9/1987 | Minet et al. | 422/49 |
| 5,154,599 A | 10/1992 | Wunning | 431/215 |
| 5,181,990 A | 1/1993 | Arisaki et al. | 196/110 |
| 5,255,742 A | * 10/1993 | Mikus | 166/303 |

(Continued)

FOREIGN PATENT DOCUMENTS

EP    450872 A1  *  10/1991

OTHER PUBLICATIONS

Khimicheskaya Entsiklopediya, M., Great Russian Encyclopedia, 508, with English translation.

*Primary Examiner*—Glenn Caldarola
*Assistant Examiner*—Vinit H. Patel

(57) ABSTRACT

This invention relates to a method for providing controlled heat to a process utilizing a flameless distributed combustion. The method of the invention comprises providing an oxidation chamber, with an inlet for oxidant, an outlet for combustion products, and a flowpath between the inlet and the outlet; transporting fuel in a fuel conduit containing a plurality of fuel nozzles distributed along substantially the entire length of the oxidation reaction chamber, each nozzle providing communication from within the fuel conduit to the oxidation chamber, the fuel nozzles being spaced so that no flame results when the fuel is mixed with the oxidant flowing through the flowpath in the oxidation chamber; preheating the oxidant to a temperature at which when the oxidant and fuel are mixed in the oxidation chamber, the temperature of resulting mixture exceeds the autoignition temperature of said mixture; and conducting a process in a process chamber which is in a heat exchange relationship with the oxidation chamber, whereby a controlled heat flux is provided to the process chamber at a desired temperature profile and at a rate of heat flux sufficient to complete the process being conducted therein.

23 Claims, 3 Drawing Sheets

U.S. PATENT DOCUMENTS

| | | | |
|---|---|---|---|
| 5,306,481 A | 4/1994 | Mansour et al. | 423/652 |
| 5,321,191 A | 6/1994 | Alagy et al. | 585/648 |
| 5,330,970 A | 7/1994 | Reid et al. | 507/90 |
| 5,424,095 A | 6/1995 | Clark et al. | 427/237 |
| 5,426,655 A | 6/1995 | Feig | 714/802 |
| 5,446,229 A | 8/1995 | Taylor et al. | 585/648 |
| 5,463,159 A | 10/1995 | Callejas et al. | 585/648 |
| 5,523,502 A | 6/1996 | Rubin | 585/324 |
| 5,536,488 A | 7/1996 | Mansour et al. | 423/652 |
| 5,554,347 A | 9/1996 | Busson et al. | 422/204 |
| 5,559,510 A | 9/1996 | Strong, III et al. | 340/954 |
| 5,567,305 A | 10/1996 | Jo | 208/48 R |
| 5,600,051 A | 2/1997 | Baker et al. | 585/648 |
| 6,153,152 A | 11/2000 | Ruhl et al. | 422/197 |

\* cited by examiner

METHOD FOR PROVIDING CONTROLLED HEAT TO A PROCESS

RELATED APPLICATIONS

This application is a division of U.S. application Ser. No. 09/168,770, filed Oct. 8, 1998, which claims the benefit of U.S. Provisional Application No. 60/062,439, filed Oct. 8, 1997, both of which are incorporated herein by reference.

FIELD OF THE INVENTION

The invention relates to a method for providing controlled heat to high temperature reactions.

BACKGROUND TO THE INVENTION

High temperature, typically endothermic, reactions such as steam methane reforming to form hydrogen from steam and hydrocarbons, and pyrolysis of hydrocarbons to produce olefins are typically carried out in furnace tubes with direct fired radiant heat transfer to the outside surface of the tubes, and flowing reactants on the inside of the tubes. Direct fired heat is often beneficial because of the high temperature level of heat required, high heat flux required, and relatively low capital cost of the furnace. But it is difficult to maintain uniform heat transfer in a fired furnace. Therefore, these furnace tube must be operated at an average tube skin temperature that is somewhat below the maximum allowable tube skin temperature because of variations in the tube skin temperatures. This variation is compounded by difficulty in measuring these temperatures. Controlling maximum temperatures is important because coke will generally develop more rapidly on the tube-side at hotter spots. Thicker coke imparts increased resistance to heat transfer, and causes the hot spot to become hotter. This effect snow-balls, and can result in failure of the tube if not detected and corrective action taken. The corrective action is typically to decrease firing of one or more burners in the vicinity of the hot spot. Decreasing firing results in lower heat transfer around the hot spot, and generally is detrimental to performance of the heater.

Lengths of tubes in fired furnaces are also generally limited due to physical constraints. In some steam-methane reforming furnaces multiple levels of burners are provided in order to distribute radiant heat more evenly to the tubes, but even with multiple levels of burners, the vertical distance over which burners can be provided is limited because of the difficulty of providing fuel and air distribution with varying amounts of draft in the furnace. Thus, when a long flowpath within a furnace is desired, multiple passes are generally provided with a plurality of elbows within the firebox. These elbows are common points of problems due to uneven flow and temperatures, and possible erosion along the inside radius.

Combustion of fuels to provide heat inherently generates nitrogen oxides ("$NO_x$") as a result of exposure of nitrogen, oxygen and free-radicals at elevated temperatures. In certain areas, emission of $NO_x$ is limited, and expensive measures such as flue gas treatments such as Selective Catalytic Reduction DeNox systems are occasionally required. Burner systems are available which reduce generation of $NO_x$ by controlling combustion temperatures, but the combustion temperatures are difficult to control, and even under ideal conditions, a significant amount of $NO_x$ is generated.

Another problem with typical fired process heaters is the limited efficiency of the radiant section of the heater. Particularly if combustion air preheating is not provided, a considerable amount of the fuel burned is utilized to heat the combustion air to flame temperatures. Even when combustion air preheat is provided, the combustion air preheat typically does not bring the temperature of the combustion air to near flame temperatures. Thus the radiant section efficiencies could be considerably improved with a more effective preheating of combustion air, and preheating of the fuel is typically not practiced because significant preheating can result in coke formation from the fuel.

Many methods have been suggested to cope with direct firing of reaction furnaces. Additives for feeds to pyrolysis furnaces have been proposed, including those described in U.S. Pat. Nos. 5,567,305, and 5,330,970. These components are said to reduce and delay the onset of coke formation, but do not eliminate the formation of coke.

Ceramic coatings and pretreatments to furnace tubes have also been suggested as being effective to reduce coking, for example, those described in U.S. Pat. Nos. 5,600,051, 5,463, 159, 5,446,229, and 5,424,095. But like treatments to the feedstocks, they are only marginally effective.

Indirect heating and electrical heating has also been suggested, in for example, U.S. Pat. Nos. 5,559,510, 5,554, 347, 5,536,488, 5,321,191, and 5,306,481 as methods to provide more even heat flux into such reactions. These methods avoid some of the disadvantages of fired furnaces, but incur additional capital and/or operating costs when compared to fired furnace heaters.

Generally, yields of such reactions as reforming of hydrocarbons to produce hydrogen and carbon oxides, olefin production by pyrolysis of hydrocarbons, and styrene production are improved with increasing temperatures. It is therefore generally desirable to operate at such increased temperatures. These temperatures are generally limited by metallurgical limitations of materials that are economical and consistency of the heat transfer to the tubes.

Further, flameless oxidation as a source of heat for injecting heat into a subterranean formation to enhance the recovery of hydrocarbons is known from U.S. Pat. No. 5,255,742. However, the heat injectors disclosed in this patent produce a relatively low heat flux, which would not make them suitable for use as a process heater for high temperature reactions.

It would be desirable to provide a process heater in which the metallurgical limitations could be more closely approached. It would be further desirable to provide such a heater which would not require excessive capital or operating costs, and which operates at a greater thermal efficiency. It would also be desirable to provide a process heater wherein generation of $NO_x$ is greatly reduced. It would also be desirable to provide such a process heater and method wherein the heat can be provided to the process in a controllable fashion. Objects of the present invention therefore include accomplishing these results, and other objects which will become apparent upon examination of the following description of the invention.

SUMMARY OF THE INVENTION

One aspect of the invention involves an improved method for providing controlled heat to a process, such as an endothermic chemical reaction or other high temperature reaction, utilizing flameless distributed combustion. The method of the invention comprises: providing an oxidation chamber, the oxidation chamber having an inlet for oxidant, an outlet for combustion products, and a flowpath between the inlet and the outlet; transporting fuel in a fuel conduit containing a plurality of fuel nozzles distributed along substantially the entire length of the oxidation chamber, with each fuel nozzle providing communication from within the fuel conduit to the oxidation chamber, the fuel nozzles being spaced so that no flame results when the fuel is mixed with the oxidant flowing through the flowpath in the oxidation chamber; preheating the oxidant to a temperature at which when the oxidant and fuel are mixed in the oxidation chamber, the temperature of the mixture of oxidant and fuel exceeds the autoignition temperature of said mixture; and conducting a process in a process chamber which is in a heat exchange relationship with the oxidation chamber, whereby controlled heat is provided to the process chamber at a desired temperature profile (e.g., a uniform temperature profile, an increasing temperature profile or a decreasing temperature profile) and rate of heat flux sufficient to complete the process being conducted therein.

The flameless distributed combustion process heater and method of the present invention can be utilized to provide a controllable heat flux into a process chamber, from a heat source which has a uniform temperature, and very low creation of $NO_x$. The uniform temperatures can be utilized to increase average temperatures without exceeding maximum temperatures, or to reduce the cost of materials.

DESCRIPTION OF A PREFERRED EMBODIMENT

Figure 1:
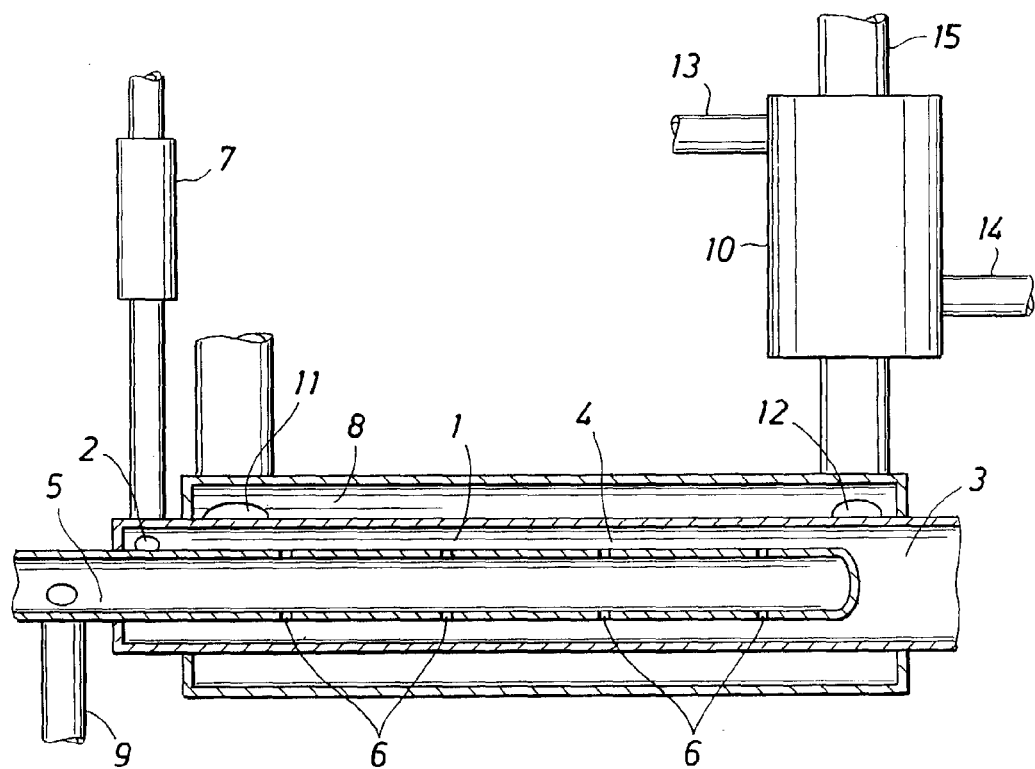
FIG. 1 shows a partial sectional of a heater of the present invention.

The process heater utilized in the method of the present invention eliminates the firebox of a conventional process heater and can be used to provide a uniform heat flux at a controlled temperature level. The fire box is replaced by, for example, concentric tubes that may be in coils, or straight. Fuel and oxidant is mixed in stages and at a temperature that results in oxidation of the fuel without producing a flame, thus eliminating the flame as a radiant source of high level heat, and replaces the flame with a flowing stream of high temperature level gas. In an endothermic process, this can result in higher temperatures within metallurgical constraints, thus resulting in many processes in improved conversions, selectivities and/or yields and reduced byproduct production. Elimination of irregular temperatures also reduces risk of failures of tubulars due to local hot spots. Radiant efficiency of flameless combustion according to the present invention can also be greater, resulting in lower energy consumption.

Flameless combustion according to the present invention also avoids the high temperature levels within flames, and the free radicals that are present within the flame. This results in substantially reducing formation of $NO_x$ compounds. $NO_x$ levels of the present invention are less than about one hundredth of the levels of conventional fired heaters, and one tenth of the levels achievable with heaters using flames stabilized in mesh.

In some endothermic processes, multiple stages of heaters are needed in order to reheat reactants for completion of the reaction to a desired level. The present invention can be applied in such processes to continuously add heat to the reaction, resulting in a single reaction stage, and that stage being at a controlled temperature profile. This advantage can be used to significantly reduce residence time requirements, lower the pressure drop through the system, and/or decrease maximum temperatures.

Heaters of the present invention utilizing flameless combustion of fuel gas at temperature levels of about 900° C. to about 1100° C. may be fabricated from high temperature alloys such as, for example, Waspalloy, Inconel 601, Inconel. 617, Incoloy 800HT, Hastelloy 235, Unimet 500 and Incoloy DS. At higher temperatures ceramic materials may be used and are preferred. Less expensive metals may be utilized in the outer conduits if internal refractor is used to limit the temperature to which such outer conduits are exposed. Ceramic materials with acceptable strength at temperatures of 900° C. to about 1400° C. are generally high alumina content ceramics. Other ceramics that may be useful include chrome oxide, zirconia oxide, and magnesium oxide based ceramics. National Refractories and Minerals, Inc., Livermore, Calif., A. P. Green Industries, Inc., Mexico, Mo., and Alcoa, Alcoa Center, Penn., provide such materials.

Generally, flameless combustion is accomplished by preheating combustion air and fuel gas to above a temperature at which when the two streams are combined the temperature of the mixture exceeds the autoignition temperature of the mixture, but to a temperature less than that which would result in the oxidation upon mixing being limited by the rate of mixing. Further, the design of the fuel nozzles and oxidation chamber is such that the fuel and air velocities are high enough to blow off any stabilized flame. Recirculation or low-velocity regions where a flame could attach to the fuel nozzle are avoided. Preheating of the streams to a temperature between about 850° C. and about 1400° C. and then mixing the fuel gas into the combustion air in relatively small increments can result in flameless combustion. The increments in which the fuel gas is mixed with the combustion gas stream preferably result in about a 20° C. to 100° C. temperature rise in the combustion gas stream due to the combustion of the fuel.

In most cases, it will be preferable to mix increments of fuel as heat is removed by the process stream to accomplish a relatively uniform temperature profile, but this is not a necessary part of the present invention. For example, it may be desired to have an increasing or decreasing temperature profile. The advantage of the present invention is that the temperature profile, or flux of heat, may be controlled to be what is desired. In an exothermic process, the present invention may be used to provide a temperature profile which increases faster than the adiabatic profile.

Although the present invention is envisioned to be most useful when maintaining a constant temperature profile in an endothermic reaction, it is not necessary that a reaction be occurring. For example, heat may be used to create a phase change such as vaporizing water to raise steam, or making glass. The process chamber could contain a vapor phase process stream, a liquid phase stream, and/or a solid phase stream.

Referring to FIG. 1, a heater of the present invention is shown in a partial sectional view. An oxidation chamber 1 (also referred to as an "oxidation reaction chamber") having an inlet 2 and an outlet 3 is shown. Between the inlet and the outlet, a flowpath 4 is provided in a heat exchange relationship with a process chamber 8. A fuel conduit 5 provides a conduit for transporting fuel to nozzles 6 spaced along the flowpath 4. The nozzles are spaced so that fuel is added to the oxidation reaction chamber at a rate that results in the flow of fuel through each nozzle not resulting in a flame as the fuel mixes with the oxidation stream flowing through the flowpath of the oxidation chamber. The fuel, rather than burning with a luminous flame, will react with oxidant in a relatively uniform manner throughout the volume of the oxidation chamber. Four sets of fuel nozzles are shown, but any number of fuel nozzles may be provided, depending on the required heat flux into the process chamber. Volume of the oxidation chamber between sets of nozzles is preferably enough that the residence time of mixture is sufficient so that a significant portion of the fuel flowing through the set of nozzles is oxidized before more fuel is added.

A process chamber 8 is in heat exchange relationship to the oxidation chamber 1. A process stream enters the process chamber at the inlet 11 and exits at an outlet 12. A quench heat exchanger 10 is shown to cool the process stream exiting the process chamber. The quenched (cooled) process stream exits the quench heat exchanger at outlet 15. A stream to be heated by the quench heat exchanger enters at quench inlet 14 and exits through quench outlet 13. The stream to be heated by the quench heat exchanger may be, for example, a process inlet stream, a boiler feed water stream that is heated and/or vaporized. In some processes, such as pyrolysis of hydrocarbons to produce olefins, rapid quench is desirable to reduce reactions to byproducts.

A coke inhibitor may be added to the fuel through an inhibitor injection system shown as injection line 9. The inhibitor injection line may include a control valve and a control system to ratio the inhibitor to the flow of fuel.

The fuel conduit contains a plurality of nozzles 6 (four sets shown) distributed along substantially the entire length of the oxidation reaction chamber as shown. The nozzles provide communication between the fuel conduit and the oxidation reaction chamber. A plurality of nozzles provide for distribution of heat release within the oxidation reaction chamber. The nozzles are sized to accomplish a desired temperature distribution within the process chamber. A nearly even temperature profile within the process chamber is generally desired because it can result in lower maximum temperatures for a given heat flux. Because the materials of construction of the apparatus dictate the maximum temperatures, even temperature profiles will increase the heat release possible for the same materials of construction The number of nozzles is limited only by size of nozzles which are to be used. If more nozzles are used, they must generally be of a smaller size. Smaller nozzles will plug more easily than larger nozzles. The number of nozzles is a trade-off between evenness of the temperature profile and the possibility of plugging.

The process chamber and the oxidation chamber are shown to be in concurrent flow, but may be in counter current flow, or a combination of the two, with for example, the oxidation chamber being a U-tube configuration. Such a configuration may be desirable to handle effects of differential thermal expansion of the conduits.

Catalyst may be provided in the process chamber, depending on the particular process.

A preheater 7 is shown to heat the oxidant stream to a temperature at which mixtures of the oxidant stream with fuel from the first set of nozzles will be sufficiently hot to result in flameless oxidation. The preheater may be, for example, a burner wherein fuel is mixed with some of the oxidant and burned to raise the temperature of the oxidant, or the oxidant may be preheated by heat exchange with either or both of the process chamber effluent or the oxidation reaction chamber effluent. A combination of heat exchange and then a burner may be utilized.

Alternatively, oxidant could be staged into the fuel by providing nozzles in a oxidant conduit instead of the fuel conduit, and forcing oxidant into a fuel rich stream at a temperature above the resultant mixtures.

Figure 2:
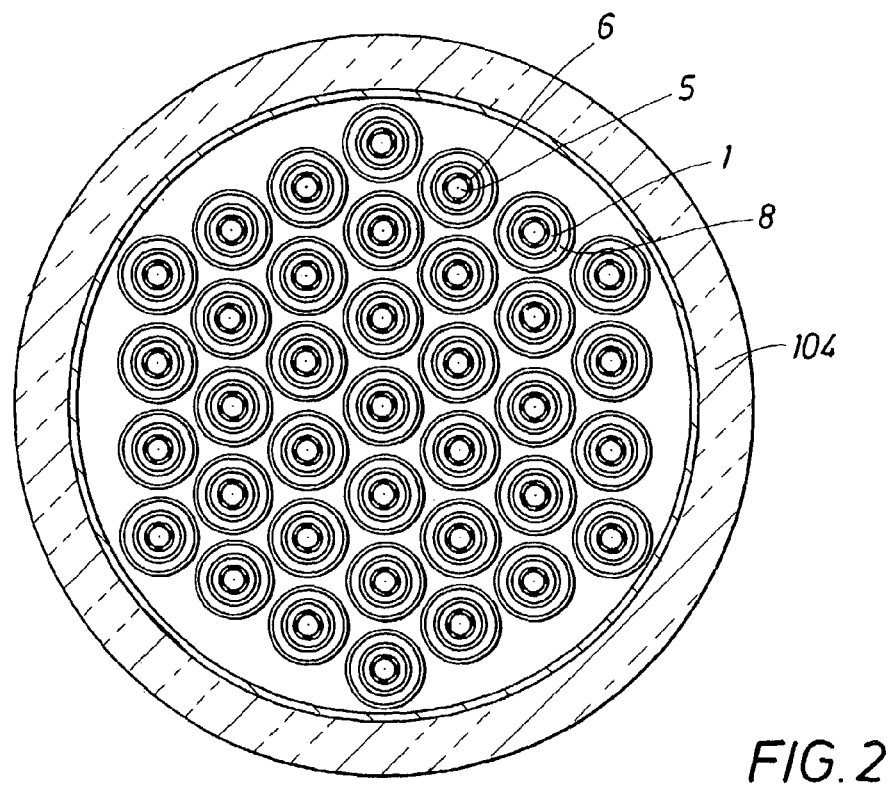
FIGS. 2 through 9 are schematics of alternative heaters of the present invention.

Referring now to FIG. 2, a cross section of an alternative embodiment is shown. In this embodiment, the process chambers 8 are in tubes that are bundled together inside an insulated casing 104. The insulated casing does not need to be a pressure vessel, but reduces heat loss from the tubes which contain the reaction chambers. Fuel conduits 5 are inside of oxidation reaction chambers 1, with nozzles 6 providing communication between the two chambers.

Figure 3:
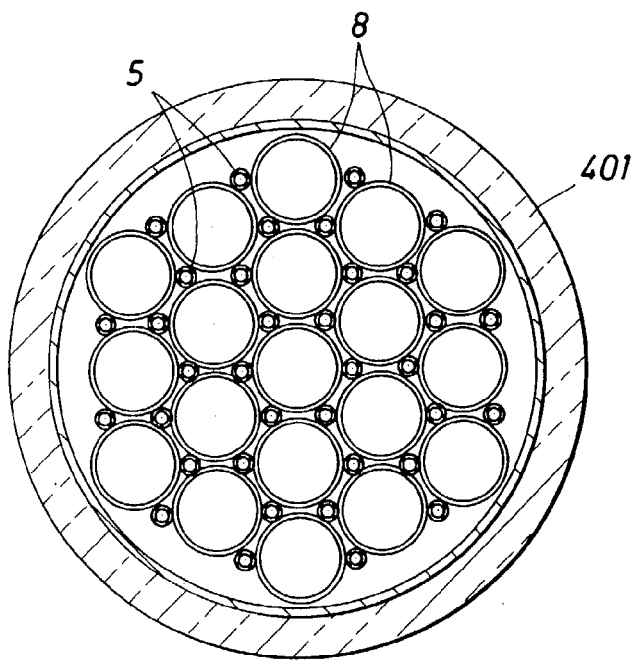

Referring now to FIG. 3, another alternative embodiment is shown. In this embodiment, the process chambers 8 are in tubes that are bundled together inside an insulated casing 401. The insulated casing also defines the combustion chamber. Fuel conduits 5 are inside the insulated casing between the tubes that define the process chambers. The tubes defining the process chambers and the fuel conduits are shown to be relatively tightly packed, but could be spaced as necessary to provide a trade-off between pressure drop and the size of the casing required. This alternative could approach the appearance of a shell and tube heat exchanger with baffles to space the tubes, and to channel flow of the combustion gasses back and forth across the tubes that define the process chambers.

The oxidation chamber may also be provided with an oxidation catalyst. The oxidation catalyst may be provided on a support such as alumina, or coated on the walls of the tubulars. The oxidation catalyst may be useful to expand the effective range of temperatures at which the flameless oxidation will operate with stability. The oxidation catalyst may also be useful for a start up phase prior to the oxidation chamber reaching a temperature at which the uncatalyzed oxidation reaction will proceed. Alternatively, catalyst may be effective to reduce the volume required in the oxidation chamber.

Preheating of hydrocarbon fuels to obtain flameless combustion could result in significant generation of carbon within the fuel conduit unless a carbon formation suppressant is included in the fuel stream. The carbon formation suppressant may be carbon dioxide, steam, hydrogen or mixtures thereof. Carbon dioxide and steam are preferred due to the generally higher cost of hydrogen.

Carbon is formed from methane at elevated temperatures according to the following reaction:

$$CH_4 \rightarrow C + 2H_2 \tag{1}$$

This reaction is a reversible reaction, and hydrogen functions as carbon formation suppressant by the reverse reaction.

Carbon dioxide suppresses carbon formation by the following reaction:

$$CO_2 + C \rightarrow 2CO \tag{2}$$

Steam suppresses carbon formation by the following reactions:

$$H_2O + C \rightarrow CO + H_2 \tag{3}$$

$$2H_2O + C \rightarrow CO_2 + 2H_2 \tag{4}$$

The carbon dioxide and the carbon monoxide remain in equilibrium at elevated temperatures according to the shift gas reaction:

$$CO + H_2O \leftrightarrow CO_2 + H_2 \tag{5}$$

When the fuel is essentially methane, a molar ratio of about 1:1 of steam to methane will be sufficient to suppress carbon formation to temperatures of about 1370° C. The molar ratios of steam to methane is preferably within the range of about 1:1 to about 2:1 when steam is utilized as the carbon formation suppressant. The molar ratio of carbon dioxide to methane is preferably within the range of about 1:1 to about 3:1 when carbon dioxide is utilized as the carbon formation suppressant. The fuel preferably consists essentially of methane due to methane being more thermally stable than other light hydrocarbons. The suppressant is additionally beneficial because it lowers combustion rates and reduces peak temperatures.

Need for the carbon formation suppressant may be eliminated if the fuel is not significantly preheated prior to addition to the oxidant stream, or if the residence time of any preheated fuel is sufficiently short.

Cold start-up of a heater of the present invention may utilize combustion with a flame. Initial ignition may be accomplished by injecting pyrophoric material, an electrical igniter, a spark igniter, or temporarily inserting an igniter. The heater is preferably rapidly brought to a temperature at which a flameless combustion is sustained to minimize the time period at which a flame exists. The rate of heating up the heater will typically be limited by the thermal gradients the heater can tolerate.

Flameless combustion generally occurs when a reaction between an oxidant stream and a fuel is not limited by mixing and the mixed stream is at a temperature higher than the autoignition temperature of the mixed stream. This is accomplished by avoiding high temperatures at the point of mixing and by mixing relatively small increments of fuel into the oxidant. The existence of flame is evidenced by an illuminate interface between unburned fuel and the combustion products. To avoid the creation of a flame, the fuel and the oxidant are preferably heated to a temperature of between about 815° C. and about 1370° C. prior to mixing. The fuel is preferably mixed with the oxidant stream in relatively small increments to enable more rapid mixing. For example, enough fuel may be added in an increment to enable combustion to raise the temperature of the stream by about 20° C. to about 100° C.

The process in which the heater and method of the present invention may be useful includes, but is not limited to: steam methane reforming, olefin production, styrene production, ammonia production, cyclohexane production, catalytic reforming of hydrocarbons, and allyl or vinyl chloride manufacture, glass or ceramic production, calcinating, reboiling of liquids in distillation, reboiling or temperature profile control in reactive distillation.

Figure 4:
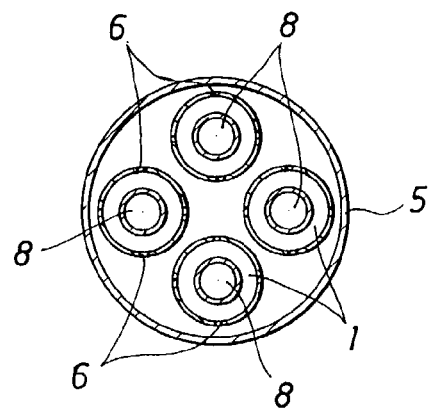

Referring now to FIG. 4, the process chamber 8 is within combustion chamber conduits which define combustion chambers 1, and the conduits defining the combustion chambers 1 are within a larger conduit 5, the fuel flowing inside of the large conduit and outside of the conduits that define the oxidation chambers. Fuel nozzles 6 are located in the conduits separating the fuel from the oxidation chambers, with the fuel flowing through the nozzles into the oxidation chambers. The advantage of this configuration is that only one large conduit is required for fuel flow.

Figure 5:
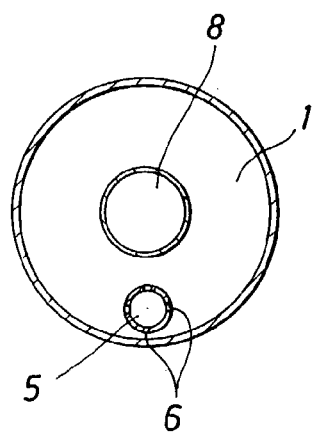

Referring now to FIG. 5, an alternative arrangement is shown wherein, rather than concentric tubulars, the fuel conduit 5 and the conduit defining the process chamber 8 are located within a conduit which defines an oxidation chamber 1. This configuration conveniently provides a relatively large cross sectional area for flow of combustion gases. This is desirable to reduce compression costs for the combustion gases, and also lowers the cost of the tubulars by having the largest diameter tubular also contain the lowest pressure.

Figure 6:
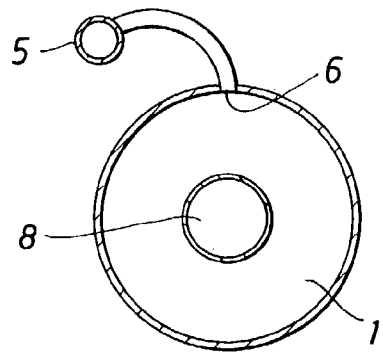

Referring now to FIG. 6, an alternative similar to that shown in FIG. 5 is shown, the difference being that the fuel conduit 5 is shown as outside of the conduit defining the combustion chamber 1. Nozzles 6 are tubular connections between the fuel conduit 5 and the tubular defining the combustion chamber 1. The advantage of this arrangement is that the fuel temperature can be limited more readily, and the need for a coke inhibition additive eliminated.

Figure 7:
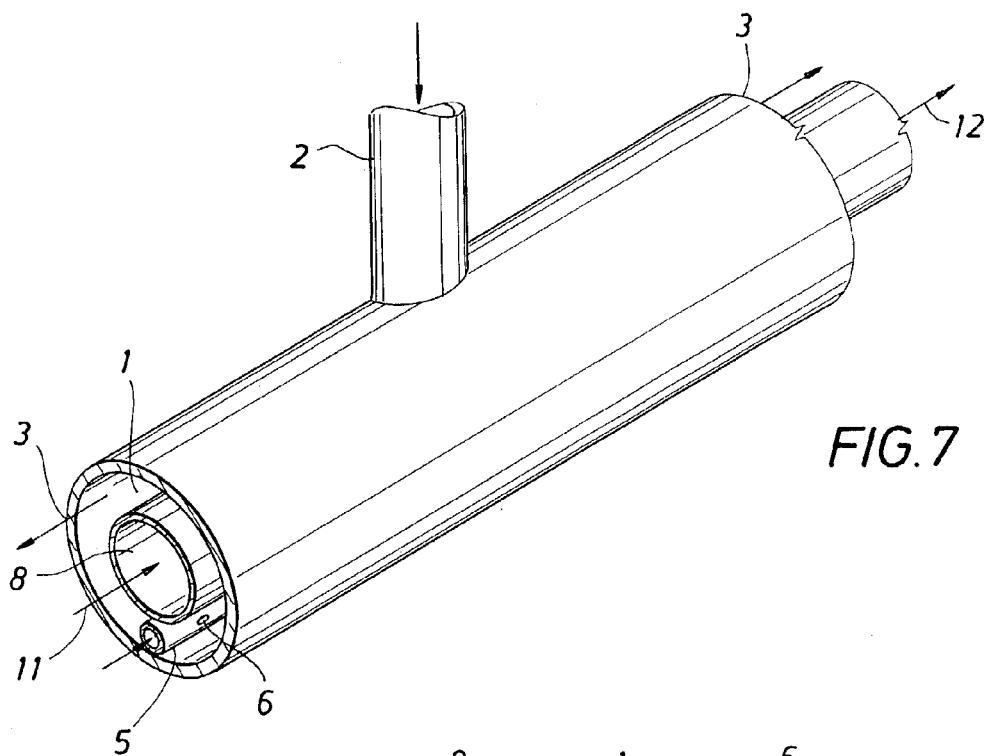

Referring now to FIG. 7, an arrangement similar to FIG. 5 is shown with an additional feature that the combustion chamber flow is split, with the inlet 2 to the oxidation chamber 1 being near the center of the length of the oxidation chamber. Flow from the inlet splits into a flow going in each direction. This split oxidation chamber permits a longer process chamber flowpath for the distance of the combustion chamber flowpath, and reduces the flow in the oxidation chamber by half. Thus, the pressure drop is reduced by a factor of about eight for similar dimensions for the combustion flowpath. This can be beneficial because of the importance of compression costs in the economics of the process. This alternative may be desirable where it is desirable to have a relatively long straight flowpath for the process. As another alternative, the fuel conduit may be outside of the oxidation chamber as in FIG. 6.

Figure 8:
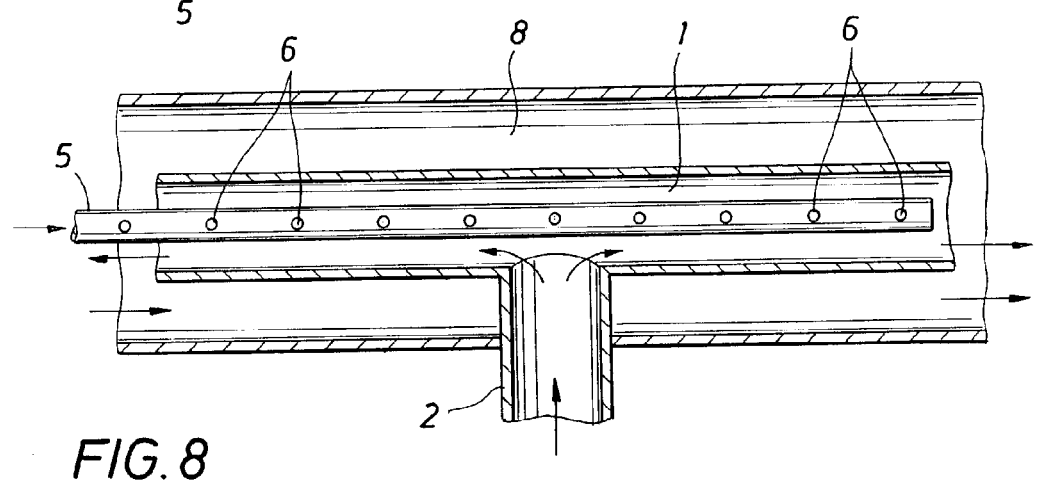

Referring now to FIG. 8, another alternative with split flow of the oxidant stream is shown. This alternative has the oxidant in an inside pipe, and the inlet dividing in a tee into a flow going in each direction.

Figure 9:
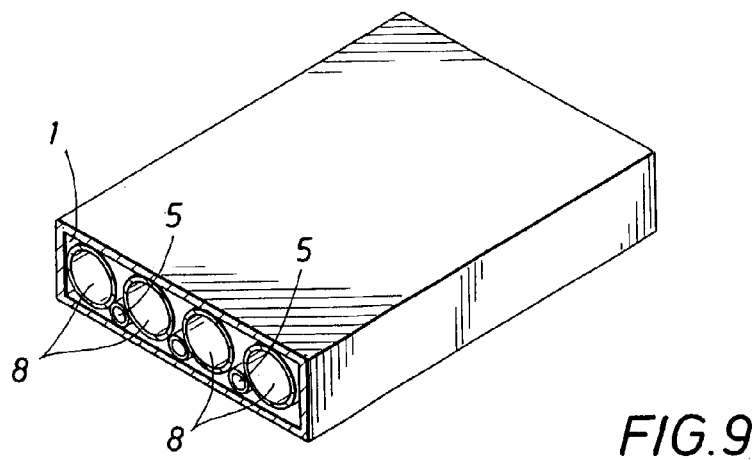

Referring now to FIG. 9, an embodiment of the present invention utilizing an oxidation chamber having a rectangular cross section is shown. The process chambers 8 are pipes in a box. The rectangular oxidation chamber 1 may be conveniently made large enough to contain a significant number of process chamber tubes 8. The process chamber tubes may be all parallel flow tubes, series flow, or combinations of parallel and series. One layer of process chamber tubes is shown, although multiple layers could be provided. When flow is at least partially in series, it may be desirable to have the inlets and the outlets in the same end and thereby reduce problems caused by thermal expansion of the tubes.

Other configuration of heat exchangers, such as corrugated plate heat exchangers such as those disclosed in U.S. Pat. No. 4,029,146, which is incorporated herein by reference, may also be utilized. With the corrugated plate heat exchangers, either a fuel conduit may be inserted in the oxidant flow space for appropriate distribution of fuel, or a third set of flow streams may be provided for with nozzles between the spaces for flow of the fuel and for flow of the oxidant.

The oxidation chambers may be vertical, horizontal or inclined, and are preferably vertical when the process chamber contains a fixed bed catalyst.

The process heater of the present invention can be utilized in styrene production in the dehydrogenation of ethyl benzene to vinyl benzene (styrene) over a catalyst such as a promoted iron oxide-potassium oxide catalyst. This dehydrogenation can be performed, for example, between 550° C. and 680° C., at pressures that range from four to about 20 kPa (3 psia) to 140 kPa (20 psia). Steam is added to the ethyl benzene feed to reduce the partial pressure of the hydrocarbons (thereby improving equilibrium ratios of the products), to act as a heat sink to reduce the temperature decrease due to the endothermic reaction, and to reduce coke formation by a water gas reaction. Most catalysts require steam to hydrocarbon molar ratios of about seven to ten. Liquid hourly space velocity based on the liquid feed is generally between about 0.4 to 0.5 hour$^{-1}$. Lower pressures are desired because of yield and catalyst stability, but higher pressures reduce the cost of compressing the product (including capital cost of the compression equipment). This is an endothermic reaction and it is desirable to perform the reaction nearly isothermally. As temperatures increase, undesirable byproducts (including coke) are produced at increasing rates, and as temperatures are decreased, yields decrease. Thus, it is desirable to operate the dehydrogenation process at nearly isothermal conditions. Benefits that could be realized by providing a more uniform temperature include reduction of the use of steam, operation at higher through puts, increasing yields and selectivity, decreasing coke make, and/or increasing the pressure of operation. Application of the present invention to dehydrogenation of ethyl benzene to styrene could be either as a heater or as a heater before the heater, although the preferred embodiment is to utilize the present invention as a heater with dehydrogenation catalyst in at least a portion of the process chamber which is heated by flameless combustion.

As a steam reforming furnace, the present invention utilizes a catalyzed process chamber to convert a hydrocarbon and steam to hydrogen, carbon monoxide and carbon dioxide. This is a highly endothermic reaction with higher temperatures favoring equilibrium of hydrogen and carbon monoxide from hydrocarbon feeds. Methane is the preferred feed for hydrogen production by steam reforming, but hydrocarbons other than methane can be utilized. The higher the molecular weights, the greater the tendency to form coke. Thus, when feed such as naphthas are used, a higher ratio of steam to carbon is generally needed. Steam to carbon molar ratios are generally between about three and five, space velocities are generally very high, in the order of 5000 to 8000 hour$^{-1}$, temperatures are generally between about 800 and 870° C., and pressures are typically between about 2 and 2.5 MPa (300 to 350 psig). Higher temperatures favor the equilibrium of hydrogen over methane, and it is typical for the heater outlet hydrogen purity to be at least at a hydrogen purity which would be at equilibrium at a temperature within 25° F. of the heater outlet temperature. The catalyst is a nickel based catalyst, and may contain potassium to inhibit coke formation.

Hydrogen production by steam reforming can be further processed by a secondary reformer to produce, for example, methanol or ammonia.

Use of the present invention in a steam reformer can result in higher average temperatures for a fixed maximum reaction chamber temperature because of the uniform distribution of heat resulting from the distributed combustion. Thus, either steam rates could be reduced, or conversion could be increased for similar tube skin temperatures.

When the present invention is utilized in a heater for thermal cracking of hydrocarbons to olefin products, reaction temperatures in the range of 775 to 950° C. and residence times of 0.1 to 0.8 seconds can be utilized. The reaction temperatures are very dependent upon the particular hydrocarbon feed, and upon the residence time. Lighter feeds, such as ethane, can be processed at higher temperatures and higher conversions. Heavier feeds, such as gas oils, required lower temperatures because of an increased tendency to form coke and other undesirable byproducts. Residence times of about 0.1 to 0.15 seconds are preferred. Dilution steam is added to the heavier hydrocarbon feed to inhibit coke deposition, and to reduce the partial pressure of the hydrocarbons. The heater effluent is preferably quenched quickly because olefin selectivity is reduced by side reactions. Quench after the reaction chamber may be either by direct contact with, for example, a gas oil stream, or indirectly by heat exchange. Indirect quench is preferred because the energy could be recovered at a more useful level.

The present invention could be utilized in, for example, a distillation column reboiler, or a vacuum flash distillation feed heater. These applications often involve heating hydrocarbons to temperatures that are limited by the tendency of the hydrocarbons to form coke, and the present invention results in a more uniform transfer of heat to the hydrocarbon stream, and thus reducing maximum temperatures of the hydrocarbons within the heaters. Further, advantages such as the reduced $NO_x$ generation are also realized.

We claim:

1. A method for providing controlled heat to an endothermic chemical process comprising:

providing an oxidation chamber, said oxidation chamber having an inlet for an oxidant, an outlet for combustion products, and a flowpath between said inlet and said outlet;

transporting fuel in a fuel conduit containing a plurality of fuel nozzles distributed along substantially the entire length of said oxidation chamber, each fuel nozzle providing communication from within said fuel conduit to said oxidation chamber, said fuel nozzles being spaced so that no flame results when said fuel is mixed with said oxidant flowing through said flowpath in said oxidation chamber thereby producing flameless, distributed combustion throughout said oxidation chamber;

preheating said oxidant to a temperature at which when said oxidant and said fuel are mixed in said oxidation chamber, the temperature of said mixture of oxidant and fuel exceeds the autoignition temperature of said mixture;

providing a process chamber enclosed by a solid wall, and having an inlet for a process stream and an outlet for process effluent;

flowing a process stream through said inlet into said process chamber;

conducting an endothermic chemical process in said process chamber which is in a heat exchange relationship with said oxidation chamber, whereby a controlled heat flux is provided to said process chamber at a rate of heat flux sufficient to complete the endothermic chemical process being conducted therein; and recovering a process effluent from said process chamber through said outlet.

2. The method of claim 1 wherein said fuel nozzles are sized to accomplish a desired temperature profile within said process chamber.

3. The method of claim 1 wherein the endothermic chemical process conducted in said process chamber is the thermal cracking of hydrocarbons to produce olefins.

4. The method of claim 1 wherein the endothermic chemical process conducted in said process chamber is the catalytic dehydrogenation of ethyl benzene to styrene.

5. The method of claim 1 further comprising providing a coke inhibitor injection system, said coke inhibitor injector system in communication with said fuel conduit, whereby coke inhibitor is supplied to said fuel in an amount effective to inhibit coke formation at fuel conduit operating temperatures.

6. The method of claim 5 wherein said coke inhibitor supplied to said fuel is selected from the group consisting of carbon dioxide and steam.

7. The method of claim 2 wherein said desired temperature profile is a decreasing temperature profile.

8. The method of claim 1 wherein said process chamber is used for the vacuum distillation of a feed.

9. The method of claim 1 wherein said oxidant is preheated by heat exchange with effluent from said process chamber.

10. The method of claim 7 wherein the endothermic chemical process conducted in said process chamber is steam hydrocarbon reforming to convert a hydrocarbon and steam to hydrogen, carbon monoxide and carbon dioxide.

11. The method of claim 2 wherein said desired temperature profile is an increasing temperature profile.

12. The method of claim 1 wherein said fuel is added to said oxidant in increments sufficient to raise the temperature of the combustion products stream in said oxidation chamber by about 20° C. to about 100° C.

13. The method of claim 2 wherein said desired temperature profile is a uniform temperature profile.

14. A method for providing controlled heat to an endothermic chemical reaction selected from the group consisting of the catalytic dehydrogenation of ethyl benzene to produce styrene, the thermal cracking of hydrocarbons to produce olefins and steam methane reforming, said method comprising:
  providing an oxidation chamber, said oxidation chamber having an inlet for an oxidant, an outlet for combustion products, and a flowpath between said inlet and said outlet;
  transporting fuel in a fuel conduit containing a plurality of fuel nozzles distributed along substantially the entire length of said oxidation chamber, each fuel nozzle providing communication from within said fuel conduit to said oxidation chamber, said fuel nozzles being spaced so that no flame results when said fuel is mixed with said oxidant flowing through said flowpath in said oxidation chamber thereby producing flameless, distributed combustion throughout said oxidation chamber;
  preheating said oxidant to a temperature at which when said oxidant and said fuel are mixed in said oxidation chamber, the temperature of said mixture of oxidant and fuel exceeds the autoignition temperature of said mixture;
  providing a process chamber enclosed by a solid wall, and having an inlet for a process stream and an outlet for process effluent;
  flowing a process stream through said inlet into said process chamber;
  conducting an endothermic chemical reaction in said process chamber which is in a heat exchange relationship with said oxidation chamber, whereby a controlled heat flux is provided to said process chamber at a desired temperature profile and rate of heat flux sufficient to complete the endothermic chemical reaction being conducted therein; and
  recovering a process effluent from said process chamber through said outlet.

15. The method of claim 14 wherein said endothermic chemical reaction is conducted in a single reaction stage.

16. The method of claim 14 wherein the endothermic chemical reaction conducted in said process chamber is a steam methane reforming process.

17. The method of claim 14 wherein the endothermic chemical reaction conducted in said process chamber is the catalytic dehydrogenation of ethyl benzene to styrene.

18. The method of claim 14 wherein the endothermic chemical reaction conducted in said process chamber is the thermal cracking of hydrocarbons to produce olefins.

19. The method of claim 14 wherein said process chamber contains a catalyst.

20. The method of claim 1 wherein said process chamber and said oxidation chamber are in concurrent flow.

21. The method of claim 1 wherein said process chamber is located within said oxidation chamber.

22. The method of claim 3 wherein the reaction temperature of said thermal cracking reaction is in the range 775° C. to 950° C. with a residence time of 0.1 to 0.8 seconds.

23. The method of claim 1 wherein said process chamber comprises parallel flow tubes.

* * * * *